United States Patent
Clymans

(10) Patent No.: US 11,066,492 B2
(45) Date of Patent: Jul. 20, 2021

(54) PROCESS FOR MANUFACTURING ETHYLENE POLYMERS AND USING MODIFIERS

(71) Applicant: ExxonMobil Chemical Patents Inc., Baytown, TX (US)

(72) Inventor: Paul J. Clymans, Kapelle-Op-Den-Bos (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 575 days.

(21) Appl. No.: 15/318,788

(22) PCT Filed: Jun. 25, 2015

(86) PCT No.: PCT/US2015/037739
§ 371 (c)(1),
(2) Date: Dec. 14, 2016

(87) PCT Pub. No.: WO2016/022225
PCT Pub. Date: Feb. 11, 2016

(65) Prior Publication Data
US 2017/0129971 A1 May 11, 2017

Related U.S. Application Data

(60) Provisional application No. 62/033,440, filed on Aug. 5, 2014.

(30) Foreign Application Priority Data

Sep. 22, 2014 (EP) .................................. 14185681

(51) Int. Cl.
| C08F 10/02 | (2006.01) |
| C08F 210/02 | (2006.01) |
| C08F 2/00 | (2006.01) |

(52) U.S. Cl.
CPC ................ C08F 10/02 (2013.01); C08F 2/00 (2013.01); C08F 210/02 (2013.01)

(58) Field of Classification Search
CPC .................................... C08F 2/00; C08F 10/02
See application file for complete search history.

(56) References Cited

U.S. PATENT DOCUMENTS

| 3,719,643 | A | 3/1973 | Knight |
| 9,243,082 | B2 | 1/2016 | Berhalter et al. |
| 9,255,159 | B2 | 2/2016 | Sultan et al. |
| 2003/0114607 | A1 | 6/2003 | Donck |
| 2005/0037219 | A1 | 2/2005 | Ohlsson et al. |
| 2005/0192414 | A1 | 9/2005 | Donck et al. |
| 2007/0032614 | A1 | 2/2007 | Goossens et al. |
| 2010/0317804 | A1* | 12/2010 | Karjala .................. C08F 10/02 525/240 |
| 2013/0085241 | A1 | 4/2013 | Solis et al. |

FOREIGN PATENT DOCUMENTS

| WO | 2007/070121 A | 6/2007 |
| WO | WO 2011-008197 | 1/2011 |
| WO | WO2015/166297 | 11/2015 |

OTHER PUBLICATIONS

Eggers, Industrial High Pressure Applications: Processes, Equipment, and Safety, John Wiley & Sons, 2012, pp. 82-84.
Maraschin, N. "Ethylene Polymers, LDPE", Encyclopedia of Polymer Science and Technology, vol. 2, pp. 412-441.
Mareschin, N. "Ethylene Polymers, LDPE", Abstract, 2pgs.
Ullmann's Encyclopedia of Technical Chemistry, 4th Revised and Expanded Ed., published by Verlag Chemie (1980) "Polyacrylic Compounds to Mercury", vol. 19 pp. 169-178.
J. Smukala, et al. (2000) "New Equation of State for Ethylene Covering the Fluid Region for Temperatures from the Melting Line to 450 K at Pressures up to 300 MPa", J. Phys. Chem. Ref. Data, vol. 29, No. 5, pp. 1-69.
D. Oeder "Moderne Verfahren der Großchemie: Ethylen-Hochdruckpolymerisation" Chemie in unserer Zeit, 1981, No. 3, 98, 4 pgs.

* cited by examiner

*Primary Examiner* — Monique R Peets
(74) *Attorney, Agent, or Firm* — ExxonMobil Chemical Patents Inc.—Law Department

(57) ABSTRACT

A process for producing ethylene polymer including compressing ethylene monomer in one or more compressors to a pressure from 1000 bar to 3000 bar; introducing the compressed ethylene monomer into one or more reactors; introducing a blend comprising an initiator and a modifier into the reactor where the ethylene monomer polymerizes forming a reaction mixture comprising unreacted ethylene monomer and ethylene polymer; and separating the ethylene polymer from the reaction mixture.

22 Claims, 3 Drawing Sheets

PROCESS FOR MANUFACTURING ETHYLENE POLYMERS AND USING MODIFIERS

CROSS REFERENCE TO RELATED APPLICATIONS

This application is a National Stage Application of International Application No. PCT/US2015/037739, filed Jun. 25 2015, which claims priority to and the benefit of Ser. No. 62/033,440, filed Aug. 5, 2014 and EP 141815681.5, filed Sep. 22, 2014, the disclosures of which are incorporated by reference in their entireties.

FIELD OF THE INVENTION

This invention relates to a process of manufacturing ethylene polymers and copolymers at high pressure using one or more modifiers.

BACKGROUND OF THE INVENTION

High pressure reactor polymerization plants convert relatively low cost olefin monomers (generally ethylene, optionally in combination with one or more comonomers such as vinyl acetate) into valuable polyolefin products. Such processes using oxygen or organic free-radical initiators, in particular peroxide initiators, are known in the art and have been used in industry for a long time. The polymerization takes place at relatively high temperatures and pressures and is highly exothermic. The resulting polymer is a low density polyethylene (LDPE), optionally containing comonomers. See, for example, Ullmann's Encyclopedia of Technical Chemistry, 4th edition, Vol. 19, 1980, pp. 169-178.

High pressure polymerization processes generally use two main compressors to compress the monomer feed each with multiple stages, arranged in series, followed by a reactor where the polymerization step itself occurs. WO 2007/018871, for example, discloses a process for making ethylene polymers using a primary compressor, a secondary compressor, and a reactor.

It is generally known to add modifiers in the suction of the secondary (high pressure) compressor or in the purge of the primary compressor to act as a chain transfer agent and thereby control the molecular weight of the ethylene product. See, for example, Industrial High Pressure Applications: Processes, Equipment, and Safety, Rudolf Eggers, John Wiley & Sons, 2012, pp. 82-84.

However, adding a modifier in the secondary compressor can lead to premature thermal polymerization, or polymer build-up in the piping of the compressor, which in turn can lead to fouling of the secondary compressor. Fouling can lead to a complete plugging of gas flow lines in the remainder of the process, unfavorably high pressure drop which in turn can lead to reduced compressor throughput, and poor pumping efficiency of the secondary compressor. Fouling in the piping of the secondary compressor is generally controlled by operating the compressor at a lower temperature and cleaning polymer build-up regularly by mechanical (e.g, hydroblasting or aquadrilling) or chemical (e.g, polymer skin materials) means.

Furthermore, it is generally known to inject one or more initiators in the reactor to initiate the free radical ethylene polymerization process. U.S. application Ser. No. 61/986, 538, filed on Apr. 30, 2014, discloses a process to manufacture ethylene including a step of introducing an initiator into five or more separate locations. However, the use of such initiators can be costly. Other background references include U.S. 2013/085241, U.S. 2007/032614, and U.S. 2005/037219.

There is therefore a need for a process for producing low density polyethylene that overcomes premature polymerization in the compressor, without significantly changing compressor operating conditions or shutting down equipment for cleaning, and that improves the initiator efficiency in the reactor.

SUMMARY OF THE INVENTION

The present invention is related to a process for producing ethylene polymer comprising compressing ethylene monomer in one or more compressors to a pressure from 1000 bar to 3000 bar; introducing the compressed ethylene monomer into one or more reactors; introducing a blend comprising an initiator and a modifier into the reactor in at least one location of the reactor, where the ethylene monomer polymerizes forming a reaction mixture comprising unreacted ethylene monomer and ethylene polymer; and separating the ethylene polymer from the reaction mixture.

The present invention is also related to a process for producing ethylene polymer comprising compressing ethylene monomer in a first compressor and a second compressor to a pressure from 1000 bar to 3000 bar; introducing the compressed ethylene monomer into one or more reactors; introducing a modifier into one or more locations; and separating the ethylene polymer from the reaction mixture, wherein the first and the second compressor has two or more stages and the second stage of the second compressor comprises a suction section and discharge, and wherein the modifier is introduced at the suction section of the second stage of the second compressor and/or the discharge of the second compressor.

DETAILED DESCRIPTION OF THE INVENTION

Figure 1:
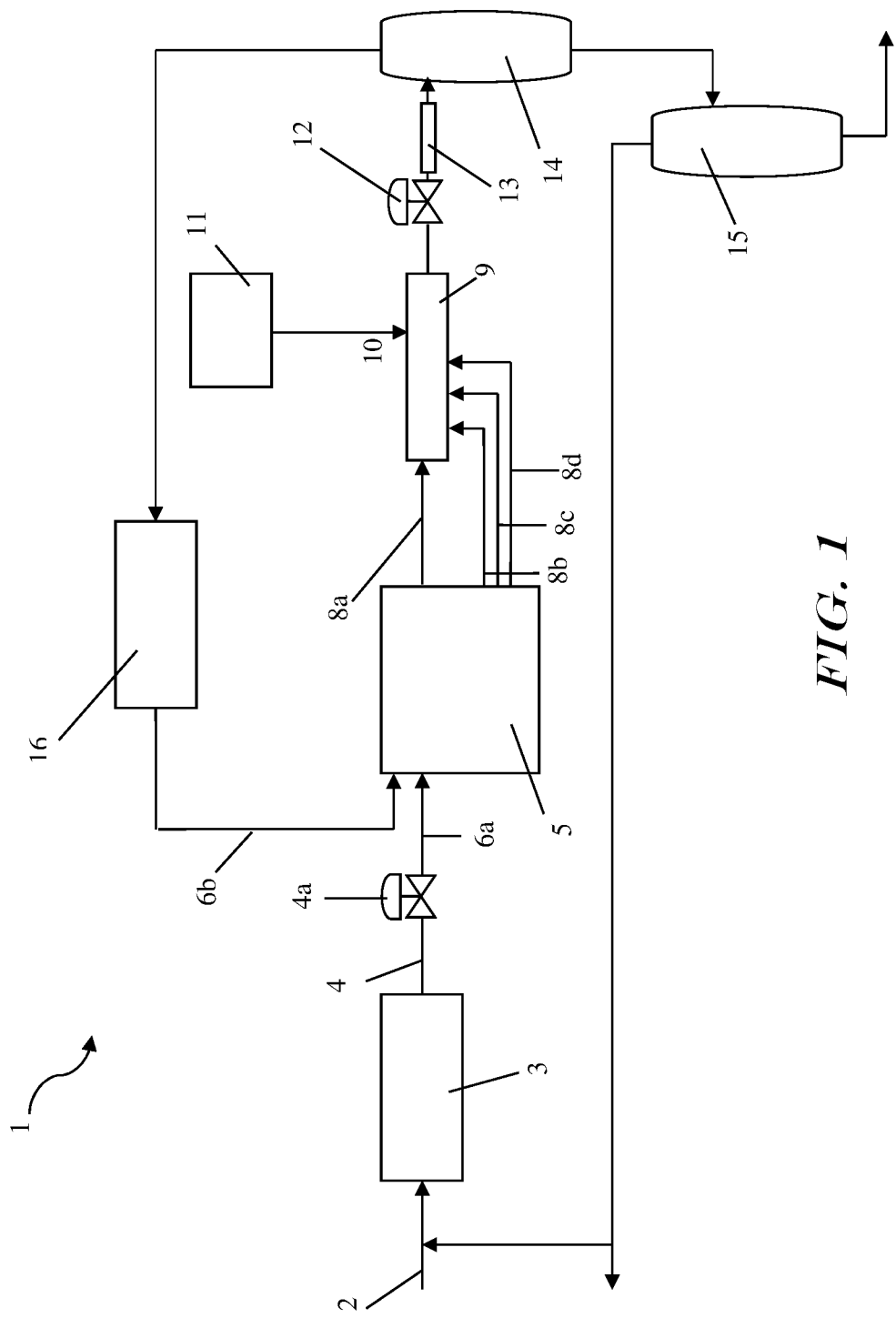
FIG. 1 shows schematically an ethylene polymerization plant or apparatus according to an embodiment of the invention.

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

Surprisingly, the inventors have discovered that adding a modifier to an initiator directly in the reactor can reduce or eliminate the amount of modifier needed in the secondary compressor, which in turn can reduce the chance of fouling of the secondary compressor. In addition, the use of certain modifiers (such as aldehydes), that are good chain transfer agents, can reduce the amount of costly initiator needed to initiate the free radical polymerization reaction. The inventors have also discovered that adding a modifier in the second stage of the secondary compressor having two or more stages, specifically the suction and/or discharge section, can reduce the chance of premature thermal polymerization as temperatures in the second stage are generally lower than those of the first stage of the secondary compressor.

Initiators

The term "initiator" as used herein refers to a compound that initiates the free radical ethylene polymerization process. Suitable initiators for use in the present invention include, but are not limited to, organic peroxide initiators. Peroxides are, for example, pure peroxide. Further examples of suitable initiators include peresters including, but not limited to, bis(2 ethylhexyl)peroxydicarbonate, tert-Butyl per(2-ethyl)hexanoate, tert-Butyl perpivalate, tert-Butyl perneodecanoate, tert-Butyl perisobutyrate, tert-Butyl per-3,5, 5-trimethylhexanoate, tert-Butyl perbenzoate, and dialkyl peroxides including, but not limited to, di-tert-butyl peroxide, and mixtures thereof.

The pure peroxides are mixed, typically in a hydrocarbon solvent, and are then injected into the reactor at the injection locations as described herein. Any suitable pump may be used, for example, a hydraulically driven piston pump.

The inventive process may advantageously use from 0.3 kg to 1.5 kg of initiator per tonne of polyethylene polymer produced, and less than 0.7 kg of initiator per tonne of polyethylene.

Modifier

The term "modifier" as used herein refers to a compound added to the process to control the molecular weight and/or melt index of a produced polymer. The term "chain transfer agent" is interchangeable with the term "modifier" as used herein. The modifier may be at least one of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetonitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof. Typically, the modifier is an aldehyde including acetaldehyde, propionaldehyde, butyraldehyde, and mixtures thereof. In an embodiment of the invention, the modifier may be present in the invention in the amount of up to 5 kg per tonne of polyethylene, or from 0.5 to 5 kg per tonne of polyethylene, or from 1 to 5 kg per tonne of polyethylene, or from 2 to 5 kg per tonne of polyethylene, or from 3 to 5 kg per tonne of polyethylene, or from 4 to 5 kg per tonne of polyethylene.

For further details of modifiers, see Advances In Polymer Science, Vol. 7, pp. 386-448, (1970). Table 7 therein ranks several chain transfer agents in order of the chain transfer constant determined under set conditions. Aldehydes, including propionaldehyde and acetaldehyde, are known to have favorably higher chain transfer constants, compared to other chain transfer agents such as propane, butane, isobutane, propene, isobutene, and 1-butene.

The modifier can be added into the reaction mixture in one or more of three separate locations. In an embodiment, the modifier may be injected along with the initiator into the reactor, thereby reducing the amount of initiator required for the process resulting in monetary savings as initiators are generally costly. In another embodiment, the modifier may be injected in the discharge of the secondary (high pressure) compressor. In yet another embodiment, the modifier may be injected in the suction of the second stage of the secondary compressor.

Process for Producing Ethylene Polymer

In an embodiment, this invention relates to a process for producing ethylene polymer comprising (1) compressing ethylene monomer in one or more compressors to a pressure from 1000 bar to 3000 bar; (2) introducing the compressed ethylene monomer into one or more reactors; (3) introducing blend of an initiator and a modifier into the reactor, where the ethylene monomer polymerizes forming a reaction mixture comprising unreacted ethylene monomer and ethylene polymer; and (4) separating the ethylene polymer from the reaction mixture, and is hereinafter discussed in detail, with reference to FIG. 1 and FIG. 2. Furthermore, the process comprises injecting a modifier in one or more of two separate locations, as illustrated in FIG. 1 and FIG. 2.

Figure 2:
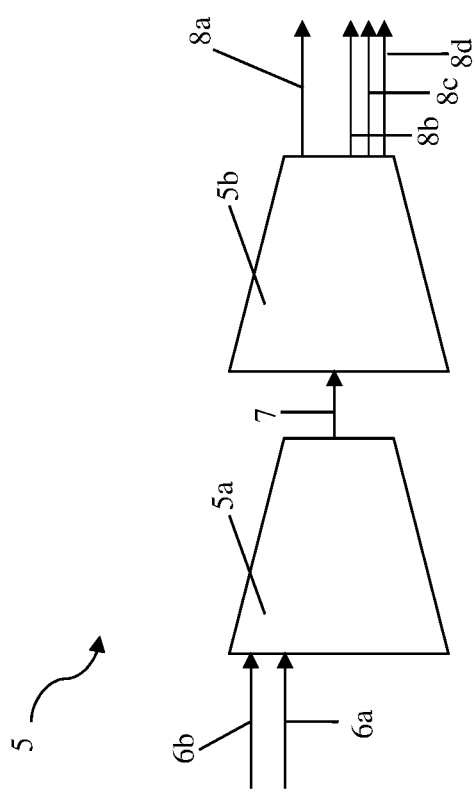
FIG. 2 shows schematically the secondary compressor of the plant or apparatus of FIG. 1.

FIG. 1 is a schematic of a polymerization plant 1 including an ethylene feed line 2 which supplies fresh ethylene to a primary compressor 3. The ethylene discharged from primary compressor 3 flows via conduit 4 having a valve 4a to the secondary compressor 5. Recycled ethylene is supplied from a high pressure recycle system 16.

Primary compressor 3 pressurizes fresh ethylene to the pressure of the ethylene recycle system, for feeding to the secondary compressor 5. The primary compressor 3 may be a single compressor, that alone pressurizes the ethylene to the same pressure of the recycle stream exiting the recycle system 16, or it may be two or more compressors in series or in parallel that, in combination, pressurize the fresh ethylene to the pressure of the ethylene recycle system (not shown). In some ethylene manufacturing plants, the ethylene discharged from the primary compressor 3 is divided into two streams, one stream being combined with recycled ethylene and fed to the suction of the secondary compressor 5 (shown), and the other stream being injected into the ethylene/polymer mixture downstream of the high-pressure, let-down valve, thereby providing rapid cooling of the ethylene/polymer mixture prior to entry into the product separation unit (not shown). In an embodiment of the invention, substantially the entire output 4 of the primary compressor 3 is fed to the secondary compressor 5.

Secondary compressor 5 compresses the ethylene to a pressure of at least 1000 bar for supply to the reactor 9. The secondary compressor 5 is typically a unit driven by a single motor, but may, alternatively comprise two or more compressors in series or in parallel driven by separate motors (not shown). Any configuration of compressors, including the configuration described in greater detail below, is intended to be within the scope of this disclosure as long as the configuration is adapted to compress the ethylene from the pressure of the ethylene as it leaves the primary compressor 3 to the desired reactor pressure in the range of from 1000 bar to 3000 bar.

FIG. 2 is a schematic of the secondary compressor 5 of the plant or apparatus of FIG. 1 including a first stage 5a and a second stage 5b. As described above, conventional high pressure ethylene processes inject modifier in the suction 6a/6b of the secondary compressor 5 to act as a chain transfer agent and thereby control the molecular weight of the ethylene product. However, injecting the modifier in this location can lead to premature polymerization and fouling of the secondary compressor.

The inventors have discovered that in an embodiment of the invention, injecting a modifier (such as aldehyde) into the suction 7 of the second stage of the secondary compressor 5b and/or the discharge 8a-8d of the second stage of the secondary compressor 5b significantly reduces fouling in the secondary compressor. This is because the temperature at the discharge of the second stage of the secondary compressor is generally lower than that of the first stage of the compressor, resulting in a less favorable environment for premature polymerization. Referring again to FIG. 1, in an embodiment of the invention, the modifier is added only with the initiator, via inlet 10 directly into the reactor 9. In another embodiment of the invention, the modifier is added only in the suction 7 and/or discharge 8a-8d of the second stage of the secondary compressor 5b, as referenced in FIG. 2. In yet another embodiment of the invention, the modifier is added both with the initiator via inlet 10 directly into the reactor 9 and in the suction 7 and/or discharge 8a-8d of the second stage of the secondary compressor 5b.

In an embodiment of the invention, the process may be used to manufacture ethylene copolymers such as ethylene-vinyl acetate copolymers. Typically, the comonomer(s) will be pressurized and injected in the suction of the secondary compressor 5 at one or more points (not shown). Other possible comonomers include, but are not limited to, propylene, 1-butene, iso-butene, 1-hexene, 1-octene, other lower alpha-olefins, methacrylic acid, methyl acrylate, acrylic acid, ethyl acrylate, and n-butyl acrylate.

The secondary compressor 5 discharges compressed ethylene into multiple streams, a main feed stream 8a, and a plurality of sidestreams. The number of sidestreams may vary from 2 and 4, and in an embodiment of the invention, the number of sidestreams may be 3, as depicted in FIG. 1, as 8b, 8c, and 8d. In an embodiment, stream 8a accounts for 33% of the total ethylene flow. Stream 8a is heated by a steam jacket (not shown) which heats the ethylene, prior to entry into the front end of reactor 9. The remaining ethylene sidestreams 8b, 8c, and 8d each enter at various points along the reactor after being cooled. It is generally known that sidestreams 8b, 8c, and 8d may contain fresh ethylene, recycled ethylene, or a combination of both (not shown). An initiator can be injected into the discharge of the secondary compressor 5, by introducing it into the main feed stream 8a and/or into one or more sidestreams 8b, 8c, and 8d (not shown). In a preferred embodiment, the initiator is injected downstream of the streams 8a, 8b, 8c, and 8d via inlet 10 as described below.

In an embodiment of the invention, reactor 9 has a plurality of inlets for the injection of a blend of an initiator and modifier. Ethylene is introduced into the front end of the reactor 9 and is heated to at least 95° C. and alternatively from 160° C. to 200° C. so that upon introduction of the initiator-modifier blend, the polymerization reaction begins. The number of initiator-modifier inlets may vary from 4 to 7, but is typically at least 1, as is depicted in FIG. 1 as 10, and is fed from an initiator-modifier mixing and pumping station 11. The initiator-modifier injection point 10 defines the start of the reaction zone. Initiator-modifier entering through inlet 10 combines with the hot ethylene from stream 8a and polymerization begins, raising the temperature of the ethylene as it travels down reactor 9. The temperature of the reaction mixture peaks at from 275° C. to 350° C., as initiator-modifier is consumed and the rate of polymerization begins to fall, and then begins to decline as a heating/cooling jacket (not shown) fitted on reactor 9 cools the reaction mixture. Entry of first sidestream 8b cools the reaction mixture further. Entry of the subsequent sidestreams 8c and 8d further cool the reaction mixture.

The proportion of the total ethylene which enters the reactor 9, whether in the main feed stream 8a or as a sidestream 8b, 8c, or 8d, which is converted to polymer before exiting the reactor 9 is referred to as the conversion. In an embodiment of the invention, the conversion may be from 30% to 40% and alternatively at least 35%. Conversions of higher than 40% are feasible but are not preferred, partly because the viscosity of the reaction mixture increases with its polymer content, which leads in turn to an increase in the pressure drop required to maintain the necessary flow velocity.

In the process of polymerizing ethylene in the reactor 9, once the desired throughput of ethylene through the secondary compressor 5 and into the reactor 9 is established, the pressure in the reactor is typically controlled by the high-pressure, let-down valve 12, through which the product mixture exits the reactor 9. Immediately downstream of the high-pressure, let-down valve 12 is product cooler 13. Upon entry to product cooler 13, the reaction mixture is in a phase separated state.

Product separation may be carried out in a single stage, however, two stage separation is generally practiced. Upon being cooled, the reaction mixture leaves the product cooler 13 and enters a high pressure separator 14, where the first separation of polymer from unreacted ethylene is carried out. The overhead gas from high pressure separator 14 flows into high pressure recycle system 7 where the unreacted ethylene is cooled and returned to secondary compressor 5 in embodiments utilizing a recycle stream.

The polymer product flows from the bottom of high pressure separator 14 into low pressure separator 15, separating almost all of the remaining ethylene from the polymer. The remaining ethylene is transferred either to a flare (not shown) or a purification unit (not shown) or is recycled to primary compressor 3. Molten polymer flows from the bottom of low pressure separator 15 to an extruder (not shown) for extrusion, cooling, and pelletizing.

The ethylene polymer product manufactured according to the invention may have a density of from 0.910 to 0.930 g/cm$^3$ (as measured by ASTM D1505) and a melt index of from 0.1 to 20 dg/min (as measured by ASTM D1238). Typically, the ethylene polymer obtained from the process according to the invention has a density of from 0.915 to 0.920 g/cm$^3$ and a melt index of from 2 to 6 dg/min.

EXAMPLES

The effect of adding a modifier with an initiator to achieve suitable ethylene product was evaluated. Ethylene was fed to a lab-scale autoclave reactor by means of a membrane compressor. 30 molppm of t-butylperbenzoate (an initiator) was introduced with a modifier (either propionaldehyde, acetaldehyde, or no modifier for the control) via a syringe-type pump. The autoclave pressure was maintained at 1800 bar. The autoclave temperature, measured by two thermocouples inside the autoclave, was increased from 185° C. to 245° C. The residence was 60 seconds. The same test was conducted with a blend of initiator and two different modifiers (1 wt % propionaldehyde (a modifier) and t-butylperbenzonate (an initiator) and 0.78 wt % acetaldehyde (a modifier) and t-butylperbenzoate (an initiator)). The amount of ethylene polymer produced and the amount of feed initiator were used to calculate the initiator consumption. The results are provided in FIG. 3.

Figure 3:
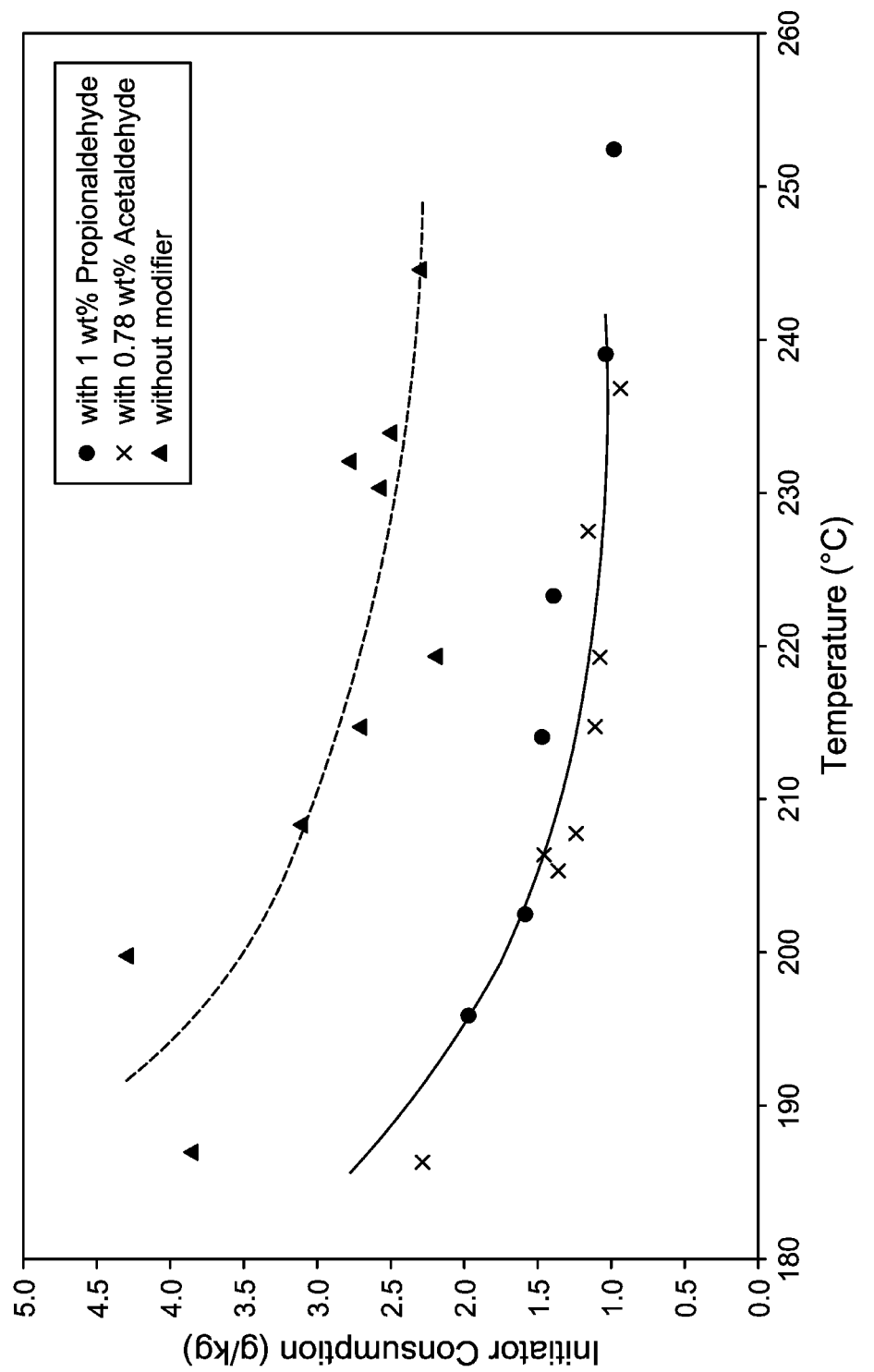
FIG. 3 shows the effect of adding modifier on the initiator consumption.

FIG. 3 shows the effect of adding modifier on the initiator consumption to achieve a certain ethylene product conversion at a given temperature. Generally, adding a modifier to the initiator showed a significant (100%) decrease in the amount of initiator required to achieve a certain ethylene conversion as compared to when no modifier was added, as the modifier is a chain transfer agent. Lower amounts of acetaldehyde resulted in comparable initiator consumption results as did higher amounts of propionaldehyde, indicating that acetaldehyde is more efficient at reducing the initiator consumption than propionaldehyde.

SPECIFIC EMBODIMENTS

The invention may also be understood with relation to the following specific embodiments.

Paragraph A: A process for producing an ethylene polymer comprising compressing ethylene monomer in one or more compressors to a pressure from 1000 to 3000 bar; introducing the compressed ethylene monomer into one or more reactors; introducing a blend comprising an initiator and a modifier, optionally in combination with one or more solvents, into the reactor in at least one location of the reactor, where the ethylene monomer polymerizes forming a reaction mixture comprising unreacted ethylene monomer and the ethylene polymer; and separating the ethylene polymer from the reaction mixture.

Paragraph B: The process of Paragraph A, wherein the initiator is present in the range of from 0.3 to 1.5 kg per tonne of ethylene polymer produced.

Paragraph C: The process of Paragraph A and/or B, wherein the modifier is present in the range of from 0.5 to 5 kg per tonne of ethylene polymer produced.

Paragraph D: The process of Paragraph A and optionally Paragraph B and/or C, wherein the modifier is selected from the group consisting of at least one of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof.

Paragraph E: The process of Paragraph A and optionally any one or any combination of Paragraphs B to D, wherein the modifier is selected from the group consisting of at least one of acetaldehyde, propionaldehyde, butyraldehyde, and mixtures thereof.

Paragraph F: The process of Paragraph A and optionally any one or any combination of Paragraphs B to E, wherein the initiator is selected from the group consisting of at least one of bis(2 ethylhexyl)peroxydicarbonate, tert-Butyl per(2-ethyl)hexanoate, tert-Butyl perpivalate, tert-Butyl perneodecanoate, tert-Butyl perisobutyrate, tert-Butyl per-3,5,5-trimethylhexanoate, tert-Butyl perbenzoate, and dialkyl peroxides.

Paragraph G: The process of Paragraph A and optionally any one or any combination of Paragraphs B to F, wherein the one or more reactors is selected from the group consisting of at least one of an autoclave, a tubular reactor, or a combination thereof.

Paragraph H: The process of Paragraph A and optionally any one or any combination of Paragraphs B to G, wherein from 30% to 40% of the ethylene monomer is converted to the ethylene polymer.

Paragraph I: The process of Paragraph A and optionally any one or any combination of Paragraphs B to H, wherein the ethylene polymer has a melt index of no less than 3 dg/min and a density of from 0.915 g/cm$^3$ to 0.920 g/cm$^3$.

Paragraph J: The process of Paragraph A and optionally any one or any combination of Paragraphs B to I, wherein no comonomer is introduced into the one or more reactors and the ethylene polymer is an ethylene homopolymer.

Paragraph K: The process of Paragraph A and optionally any one or any combination of Paragraphs B to J, wherein one or more comonomers is introduced into the one or more reactors, and wherein the one or more comonomers is selected from the group consisting of at least one of vinyl acetate, propylene, 1-butene, iso-butene, 1-hexene, 1-octene, methacrylic acid, methyl acrylate, acrylic acid, ethyl acrylate, n-butyl acrylate, and mixtures thereof.

Paragraph L: A process for producing an ethylene polymer comprising compressing ethylene monomer in a first and a second compressor to a pressure from 1000 to 3000 bar; introducing the compressed ethylene monomer into one or more reactors; introducing a modifier into one or more locations; and separating the ethylene polymer from the reaction mixture; wherein the first and the second compressor has two or more stages and the second stage of the second compressor comprises a suction section and discharge, and wherein the modifier is introduced at the suction section of the second stage of the second compressor and/or the discharge of the second compressor.

Paragraph M: The process of Paragraph L, wherein the initiator is present in the range of from 0.3 to 1.5 kg per tonne of ethylene polymer produced.

Paragraph N: The process of Paragraph L and/or M, wherein the modifier is present in the range of from 0.5 to 5 kg per tonne of ethylene polymer produced.

Paragraph O: The process of Paragraph L and optionally Paragraph M and/or N, wherein the modifier is selected from the group consisting of at least one of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof.

Paragraph P: The process of Paragraph L and optionally any one or any combination of Paragraphs M to O, wherein the modifier is selected from the group consisting of at least one of acetaldehyde, propionaldehyde, butyraldehyde, and mixtures thereof.

Paragraph Q: The process of Paragraph L and optionally any one or any combination of Paragraphs M to P, wherein the initiator is selected from the group consisting of at least one of bis(2 ethylhexyl)peroxydicarbonate, tert-Butyl per(2-ethyl)hexanoate, tert-Butyl perpivalate, tert-Butyl perneodecanoate, tert-Butyl perisobutyrate, tert-Butyl per-3,5,5,-trimethylhexanoate, tert-Butyl perbenzoate, and dialkyl peroxides.

Paragraph R: The process of Paragraph L and optionally any one or any combination of Paragraphs M to Q, wherein the one or more reactors is selected from the group consisting of at least one of an autoclave, a tubular reactor, or a combination thereof.

Paragraph S: The process of Paragraph L and optionally any one or any combination of Paragraphs M to R, wherein from 30% to 40% of the ethylene monomer is converted to the ethylene polymer.

Paragraph T: The process of Paragraph L and optionally any one or any combination of Paragraphs M to S, wherein the ethylene polymer has a melt index of no less than 3 dg/min and a density of from 0.915 g/cm$^3$ to 0.920 g/cm$^3$.

Paragraph U: The process of Paragraph L and optionally any one or any combination of Paragraphs M to T, wherein no comonomer is introduced into the one or more reactors and the ethylene polymer is an ethylene homopolymer.

Paragraph V: The process of Paragraph L and optionally any one or any combination of Paragraphs M to U, wherein one or more comonomers is introduced into the one or more reactors, and wherein the one or more comonomers is selected from the group consisting of at least one of vinyl acetate, propylene, 1-butene, iso-butene, 1-hexene, 1-octene, methacrylic acid, methyl acrylate, acrylic acid, ethyl acrylate, n-butyl acrylate, and mixtures thereof.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for producing an ethylene polymer comprising:
   compressing ethylene monomer in at least a first compressor and a second compressor to a pressure of 1000 to 3000 bar to produce a compressed ethylene monomer;
   introducing a blend comprising an initiator and a first portion of a modifier, optionally in combination with one or more solvents, into a discharge section of a second stage of the second compressor;
   introducing a second portion of the modifier into a suction section of the second stage of the second compressor such that the second portion of the modifier bypasses a first stage of the second compressor;
   introducing a mixture of the compressed ethylene monomer and the blend into a reactor in at least one location of the reactor, where the ethylene monomer polymerizes forming a reaction mixture comprising unreacted ethylene monomer and the ethylene polymer; and
   separating the ethylene polymer from the reaction mixture.

2. The process of claim 1, wherein the initiator is present in an amount of 0.3 to 1.5 kg per tonne of ethylene polymer produced, and wherein the modifier is present in an amount of 0.5 to 5 kg per tonne of ethylene polymer produced.

3. The process of claim 1, wherein the modifier is selected from the group consisting of at least one of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof.

4. The process of claim 1, wherein the modifier is selected from the group consisting of at least one of acetaldehyde, propionaldehyde, butyraldehyde, and mixtures thereof.

5. The process of claim 1, wherein the initiator is selected from the group consisting of at least one of bis(2 ethylhexyl) peroxydicarbonate, tert-Butyl per(2-ethyl)hexanoate, tert-Butyl perpivalate, tert-Butyl perneodecanoate, tert-Butyl perisobutyrate, tert-Butyl per-3,5,5,-trimethylhexanoate, tert-Butyl perbenzoate, and dialkyl peroxides.

6. The process of claim 1, wherein the one or more reactors is selected from the group consisting of at least one of an autoclave, a tubular reactor, or a combination thereof.

7. The process of claim 1, wherein from 30% to 40% of the ethylene monomer is converted to the ethylene polymer.

8. The process of claim 1, wherein the ethylene polymer has a melt index of no less than 0.1 dg/min. and a density of from 0.915 g/cm³ to 0.930 g/cm³.

9. The process of claim 1, wherein no comonomer is introduced into the one or more reactors and the ethylene polymer is an ethylene homopolymer.

10. The process of claim 1, wherein one or more comonomers is introduced into the one or more reactors, and wherein the one or more comonomers is selected from the group consisting of at least one of vinyl acetate, propylene, 1-butene, iso-butene, 1-hexene, 1-octene, methacrylic acid, methyl acrylate, acrylic acid, ethyl acrylate, n-butyl acrylate, and mixtures thereof.

11. A process for producing an ethylene polymer comprising:
compressing ethylene monomer in a first compressor and a second compressor to a pressure of 1000 to 3000 bar to produce a compressed ethylene monomer;
introducing the compressed ethylene monomer into one or more reactors;
introducing a modifier into one or more locations within the one or more reactors;
polymerizing the ethylene monomer to produce a reaction mixture comprising the ethylene polymer and unreacted ethylene monomer; and
separating the ethylene polymer from the reaction mixture;
wherein the first compressor and the second compressor have two or more stages and the second stage of the second compressor comprises a suction section and a discharge section, and wherein the modifier is introduced at the suction section of the second stage of the second compressor such that the modifier bypasses the first stage of the second compressor.

12. The process of claim 11, further comprising introducing an initiator into the one or more reactors, wherein the initiator is present in an amount of 0.3 to 1.5 kg per tonne of ethylene polymer produced, and wherein the modifier is present in an amount of 0.5 to 5 kg per tonne of ethylene polymer produced.

13. The process of claim 11, wherein the modifier is selected from the group consisting of at least one of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof.

14. The process of claim 11, wherein the modifier is selected from the group consisting of at least one of acetaldehyde, propionaldehyde, butyraldehyde, and mixtures thereof.

15. The process of claim 12, wherein the initiator is selected from the group consisting of at least one of bis(2 ethylhexyl)peroxydicarbonate, tert-Butyl per(2-ethyl) hexanoate, tert-Butyl perpivalate, tert-Butyl perneodecanoate, tert-Butyl perisobutyrate, tert-Butyl per-3,5,5,-trimethylhexanoate, tert-Butyl perbenzoate, and dialkyl peroxides.

16. The process of claim 11, wherein the one or more reactors is selected from the group consisting of at least one of an autoclave, a tubular reactor, or a combination thereof, and wherein from 30% to 40% of the ethylene monomer is converted to the ethylene polymer.

17. The process of claim 11, wherein the ethylene polymer has a melt index of no less than 0.1 dg/min. and a density of from 0.915 g/cm³ to 0.930 g/cm³.

18. The process of claim 11, wherein no comonomer is introduced into the one or more reactors and the ethylene polymer is an ethylene homopolymer.

19. The process of claim 11, wherein one or more comonomers is introduced into the one or more reactors, and wherein the one or more comonomers is selected from the group consisting of at least one of vinyl acetate, propylene, 1-butene, iso-butene, 1-hexene, 1-octene, methacrylic acid, methyl acrylate, acrylic acid, ethyl acrylate, n-butyl acrylate, and mixtures thereof.

20. The process of claim 1, wherein the modifier is present in an amount of 0.5 to 3 kg per tonne of ethylene polymer produced.

21. The process of claim 1, wherein the modifier is present in an amount of 0.5 to 2 kg per tonne of ethylene polymer produced.

22. The process of claim 11, wherein a blend comprising additional modifier and an initiator is introduced at the discharge section of the second stage of the second compressor.

* * * * *